May 24, 1932.  D. M. WATSON ET AL  1,860,331
HAND TRUCK
Filed Oct. 7, 1930  2 Sheets-Sheet 1
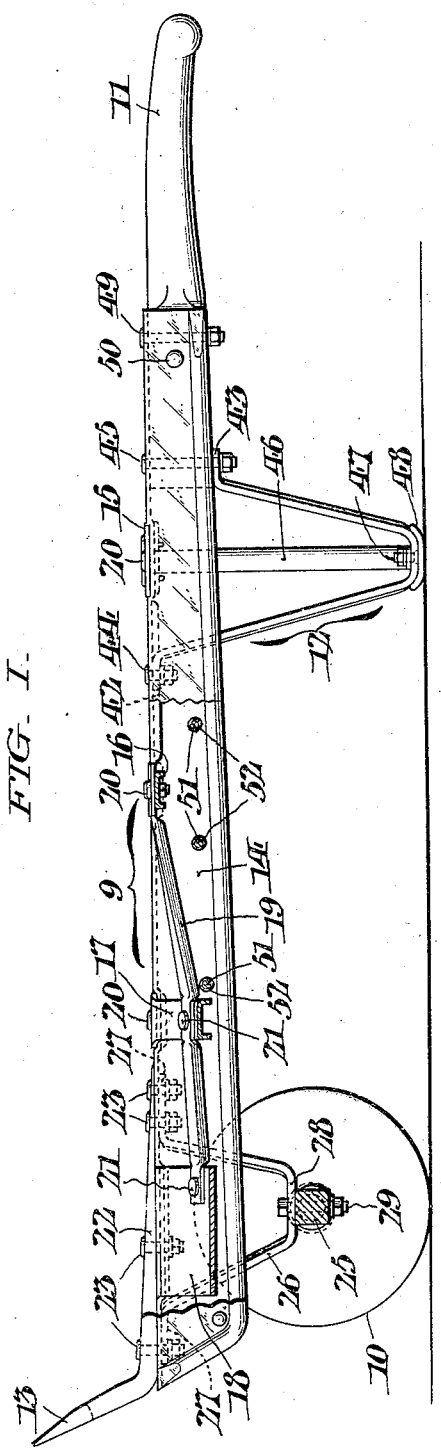
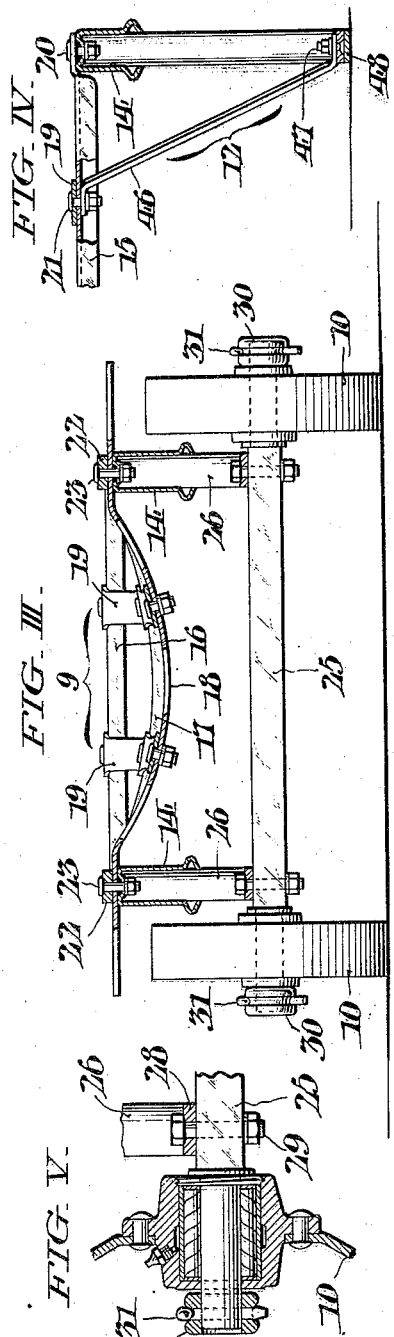
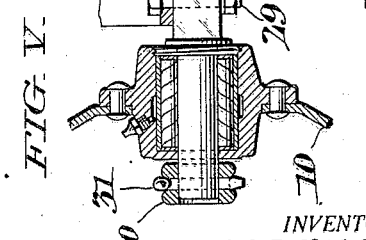
INVENTORS:
David M. Watson &
Gonzalo C. Munoz,
BY Haley Paul
ATTORNEYS.

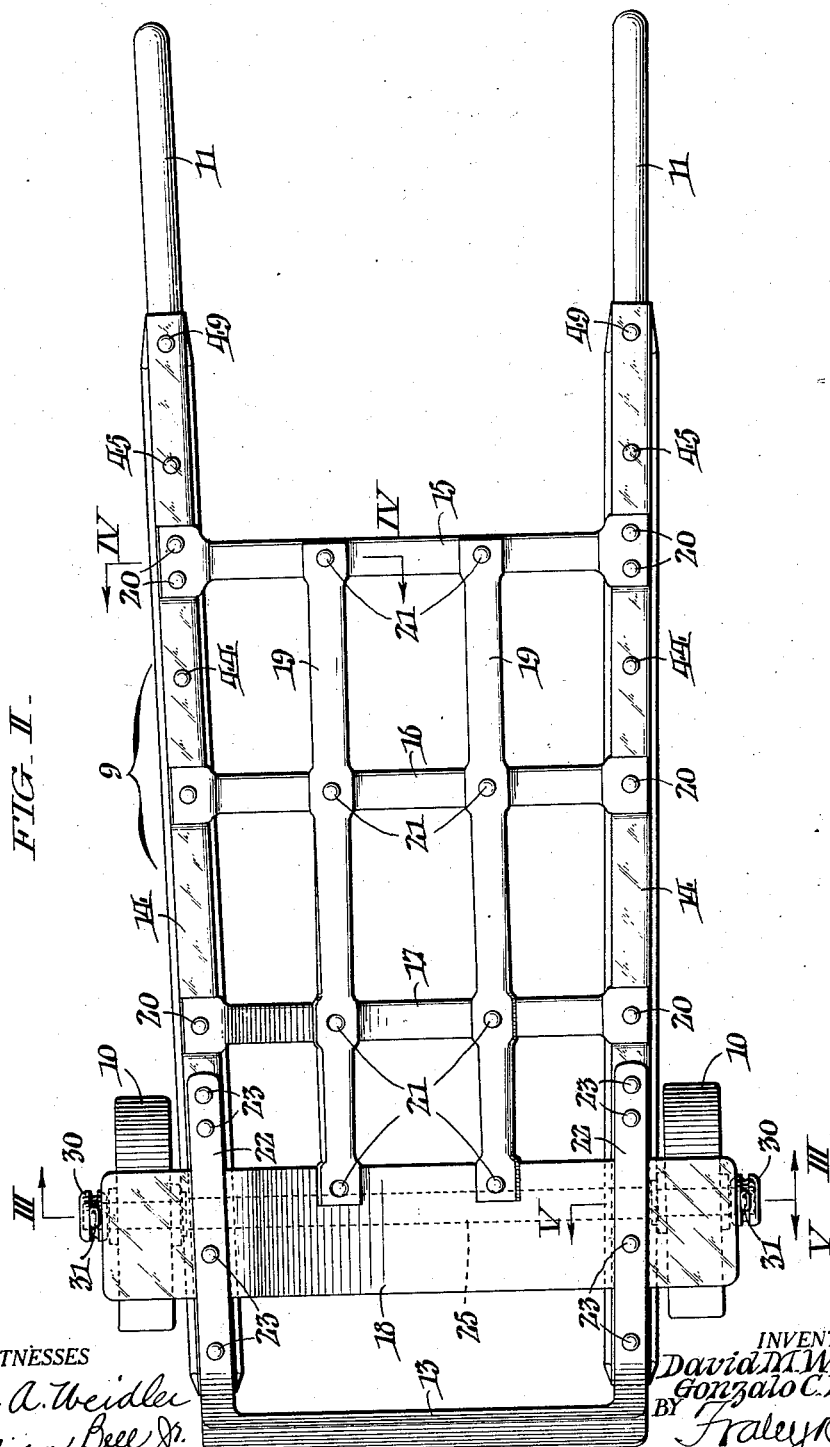

Patented May 24, 1932

1,860,331

UNITED STATES PATENT OFFICE

DAVID M. WATSON, OF ARDSLEY, AND GONZALO C. MUNOZ, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA

HAND TRUCK

Application filed October 7, 1930. Serial No. 486,877.

This invention relates to hand trucks such as are used for handling freight, baggage, packages and bulky or heavy articles of various kinds. We aim to improve and strengthen the construction of such trucks, adapting them to handle heavy loads, and to support different kinds of loads effectively. How these and other advantages can be realized through the invention will appear from the description hereinafter of one preferred form of embodiment.

In the drawings, Fig. I is a side view of a hand truck conveniently embodying our invention, certain portions being broken away and removed as indicated by the line and arrows I—I in Fig. II.

Fig. II is a plan view of the truck.

Figs. III, IV and V are views at right-angles to Fig. I, with certain parts in vertical section, taken as indicated by the lines and arrows III—III, IV—IV and V—V in Fig. II.

The truck here shown includes a frame 9 with wheels 10, 10 near one end, handles 11, 11 at the other end, and intermediate legs 12, 12, on which the truck may rest with its frame in horizontal or slightly sloping position. It also has an upward-sloping nose piece 13 at the end beyond the wheels 10, 10. The frame 9 comprises longitudinal side members or sills 14, 14, of channel section, with bead-embossed lower edges, united by the U-shaped nose piece 13 and by cross members 15, 16, 17, 18, all of channel section excepting the cross member 18 at the nose end of the truck frame, which is shown as a wide metal plate. With the cross members 15, 16, 17, 18 are associated intermediate longitudinals 19, 19, of channel section, which cooperate with the cross members to form an openwork cradle or bottom for the truck.

As shown in Figs. I and II, the cross members 15, 16, 17 have their ends flattened by outward bending of the channel flanges, and seated in depressions in the sills 14, 14, to which they are secured by one or more fastenings 20 each, through the channel webs of the members 14, 14. The cross member 18 is similarly seated in depressions in the sills 14, 14, and secured as hereinafter described. The intermediate longitudinals 19, 19 are flattened at their intersection with the cross members 15, 16, 17, 18, and secured thereto by fastenings 21, so as to interconnect the cross members. While the cross members 15 and 16 are substantially straight, so as to afford fully distributed support to a flat-sided box or package resting on the truck, the cross members 17 and 18 are concaved, as shown especially in Figs. I and III, to accommodate the convexity of a sack, bale, package or barrel, the member 18 being concaved more than the member 17. The ends 22, 22 of the nose piece 13 extend rearward along the tops of the sills 14, 14, over the ends of the cross member 18, and are secured to the sills by fastenings 23, one of which extends through the member 18 at each of the sills. The ends of the wide cross member 18 project to either side of the sills 14, 14 over the wheels 10, 10, so as to protect the wheels from contact or entanglement with the truck load.

It will be seen, therefore, that the cross members 15, 16, 17, and 18 and the longitudinals 19, 19 together form an openwork cradle or bottom very well adapted to every kind of load that may be placed on the truck, being flat toward the truck handles 11, 11 to sustain a flat load over the entire width of the truck, and concaved to an increasing degree toward the nose 13 to accommodate and hold a soft or a convex load. The ample width of the member 18 assures ample support to a sack or bale end between the side members 14, 14, and its projecting ends serve to prevent even a very wide load from tipping to either side of the truck. The intermediate longitudinals 19, 19 serve to prevent a soft load—whether a sack, bale, or package—from sagging down objectionably between the cross members 15, 16, 17, 18.

As shown in Figs. I, II, and III, the wheels 10, 10 are mounted on an axle 25 that is secured to V-brackets 26, 26 of flat bar metal. The upright portions of each bracket 26 are cylindrically concaved inward for greater rigidity, and their upper ends are bent outward to form flat feet or ears 27, 27, which lie inside the channel 14 and are fastened to the bottom of the channel web by one of the same fastenings 23 that secure the nose piece end 22. The axle 25 is fastened to the horizontal mid portion 28 of the bracket 26 by a fastening 29 through the axle and the bracket. The wheels 10, 10 are mounted on the ends of the axle 25, outside the brackets 26, 26 and sills 14, 14. The wheels 10, 10 are held in place on the axle 25 by collars 30, 30 on the extreme ends of the axle, each secured thereto by a cotter pin 31 extending through diametral holes in the collar and the axle. The eye and the bent-apart ends of the cotter pin 31 lie in a semi-circular circumferential peripheral groove in the collar. The corners or edges of the collar are rounded or beaded quarter-round, so as not to catch on any fabric or the like with which they may come in contact.

As shown in Fig. I, each of the truck legs 12, 12 is V-shaped, and formed of flat bar metal suitably bent. The upright portions of each leg 12 are cylindrically concaved inward for greater rigidity, and their upper ends are bent outward to form flat feet or ears 42, 43, which are secured to the sills 14, 14 by fastenings 44, 45. The ear 42 lies directly against the inside of the channel web (Figs. I and III), while the wooden handle 11 intervenes between the ear 43 and the channel web, and is thus clamped by the fastenings 45. Each leg 12 is braced transversely by a diagonal sway brace 46 of flat bar metal, attached to the lower end or bend of the leg by a fastening 47, and to the cross member 15, at its intersection with the longitudinal 19, by the fastening 21, that secures said parts 15, 19 to one another (Fig. IV). Each brace 46 has its upper end bent inward so as to lie flat against the web of the channel 15. The lower end of each leg 12 is shod with a bent sheet metal wear plate 48 welded thereon (Fig. I).

Each handle 11 is not only secured by the fastening 45, but also by a fastening 49 extending from its lower side up through the channel web, and by a transverse fastening 50 through the channel flanges.

As shown in Figs. I and III, each of the channelled side members 14, 14 has its flanges braced by suitably located spacing stays or fastenings 51, consisting of rivets through spacing sleeves 52 (Fig. I).

It will be understood that any of the fastenings referred to in the foregoing description, or shown in the drawings, may be either bolts or rivets, though generally shown as bolts.

Having thus described our invention, we claim:—

In a hand truck of the character described, the combination with a frame including side members having handles at their rear ends, an upstanding nose interconnecting their forward ends, and an axle with wheels adjacent said nose; of an openwork cradle bottom for the truck flat across from side member to side member toward the handles, to fully sustain a flat load, and concaved downward between said side members more and more toward the nose, to accommodate and hold a rounded or soft load; said cradle bottom comprising substantially straight, flat cross members spanned between said side members at the end of the cradle toward the truck handles and downward concaved cross members spanned between said side members at the end of the cradle toward the truck nose, together with intermediate longitudinals extending from cross member to cross member and sloping downward relative to the side members from the flat end of the cradle toward the truck nose.

In testimony whereof, we have hereunto signed our names at Philadelphia, Pennsylvania, this 2nd day of October, 1930.

DAVID M. WATSON.
GONZALO C. MUNOZ.